United States Patent
Schoeley et al.

(10) Patent No.: US 8,329,932 B2
(45) Date of Patent: Dec. 11, 2012

(54) PROCESS FOR PREPARING ORGANOSILICON COMPOUNDS CONTAINING ORGANYLOXY GROUPS

(75) Inventors: Peter Schoeley, Diera-Zehren (DE); Bernhard Ruhland, Burghausen (DE); Uwe Scheim, Coswig (DE)

(73) Assignee: Wacker Chemie AG, Munich (DE)

( * ) Notice: Subject to any disclaimer, the term of this patent is extended or adjusted under 35 U.S.C. 154(b) by 291 days.

(21) Appl. No.: 12/669,541

(22) PCT Filed: Jul. 16, 2008

(86) PCT No.: PCT/EP2008/059257
§ 371 (c)(1), (2), (4) Date: Jan. 18, 2010

(87) PCT Pub. No.: WO2009/013185
PCT Pub. Date: Jan. 29, 2009

(65) Prior Publication Data
US 2010/0197949 A1     Aug. 5, 2010

(30) Foreign Application Priority Data
Jul. 25, 2007 (DE) .......... 10 2007 034 711

(51) Int. Cl.
C07F 7/00 (2006.01)
C07F 7/04 (2006.01)
C07F 7/08 (2006.01)

(52) U.S. Cl. .......... 556/450; 556/463; 556/465

(58) Field of Classification Search .......... None
See application file for complete search history.

(56) References Cited

U.S. PATENT DOCUMENTS

| 3,147,047 | A | 9/1964 | Fites |
| 4,528,324 | A | 7/1985 | Chung et al. |
| 5,055,502 | A | 10/1991 | Frances et al. |
| 5,079,324 | A | 1/1992 | Cocco et al. |
| 5,304,621 | A | 4/1994 | Staiger et al. |
| 5,352,751 | A | 10/1994 | Cocco |
| 5,674,963 | A | 10/1997 | Friebe |
| 6,265,598 | B1 | 7/2001 | Kimura et al. |
| 2003/0067838 | A1 | 4/2003 | Schmidt |
| 2004/0082462 | A1 | 4/2004 | Scheim et al. |
| 2005/0234208 | A1 | 10/2005 | Koch et al. |
| 2006/0063895 | A1 | 3/2006 | Schoeley et al. |

FOREIGN PATENT DOCUMENTS

| DE | 10146395 A1 | 3/2002 |
| EP | 0098369 B1 | 7/1986 |
| EP | 0457693 B1 | 3/1994 |
| EP | 0304701 B1 | 12/1994 |
| EP | 0678541 B1 | 2/2000 |
| EP | 1397428 B1 | 8/2004 |
| EP | 1293245 B1 | 8/2006 |
| EP | 1640416 B1 | 6/2007 |

OTHER PUBLICATIONS

IKA Ultra-Turrax product literature.*

* cited by examiner

*Primary Examiner* — Porfirio Nazario Gonzalez
*Assistant Examiner* — James Meadows
(74) *Attorney, Agent, or Firm* — Brooks Kushman P.C.

(57) ABSTRACT

Organosilicon compounds bearing silicon-bonded organyloxy groups are prepared by mixing and reacting silanol-functional organosilicon compounds with organosilicon compounds containing at least two organyloxy groups in a mixer with an energy input of at least 0.2 kW/Kg of mixture. At this level of energy input, reaction to form the organyloxy-functional product is rapid, and can be achieved without supplying external heat, and also without catalysts, if desired.

12 Claims, No Drawings

PROCESS FOR PREPARING ORGANOSILICON COMPOUNDS CONTAINING ORGANYLOXY GROUPS

CROSS-REFERENCE TO RELATED APPLICATION

This application is the U.S. national phase of PCT Appln. No. PCT/EP2008/059257 filed Jul. 16, 2008 which claims priority to German application DE 10 2007 034 711.3 filed Jul. 25, 2007.

BACKGROUND OF THE INVENTION

1. Field of the Invention

The present invention relates to a process for preparing organosilicon compounds containing organyloxy groups and also to their use in compositions which crosslink at room temperature.

2. Description of the Related Art

RTV1 sealants, that is, one-component sealants which are storable in absence of water and on ingress of water cure at room temperature to elastomers, are known. They are used in large quantities in the building industry as grouting and sealing materials. Curing is typically accompanied by formation, through hydrolysis, of acetic acid or alcohols.

Polymeric organosilicon compounds for RTV1 sealants that through hydrolysis liberate acetic acid can be prepared very easily. Simple mixing of long-chain organopolysiloxanes which contain silanol groups on the chain ends and organosilicon compounds which contain at least 2 bound acetoxy groups on silicon is sufficient. Within a few minutes the process referred to as end capping takes place. This means that the OH groups on the chain ends of the polymers react with the acetoxysilanes.

The preparation of polymeric organosilicon compounds for RTV1 sealants which liberate alcohol on hydrolysis is substantially more involved. Thus, for example, mixtures of organosilicon compounds with groups and alkoxysilanes do not react with one another, even at relatively high temperatures. If, however, catalysts such as tin compounds or titanium compounds are added, then the components react directly to three-dimensionally crosslinked products which are not useful in RTV1 compositions.

The reaction can often be controlled more effectively when employing alkoxysilanes, if the latter contain hydrolyzable groups which are more reactive than the alkoxy groups. Thus EP-B-98 369 describes the reaction of dihydroxydiorganopolysiloxanes with alkoxyoximosilanes, and U.S. Pat. No. 3,147,047 describes the reaction with alkoxyamidosilanes. The preparation of these hybrid silanes, however, is very involved. Moreover, it is usually very difficult to remove the resultant hydrolysis products from the reaction mixture.

Catalysts and catalyst systems which lead very quickly to the desired end capping reaction have been suggested, but these are so reactive that they lead to unwanted polymer rearrangements, such as, for example, the hydroxide ions described in EP-B-457 693, or require deactivation by disadvantageous precipitation from high-viscosity solutions, such as fluoride ions, which are disclosed in EP-B-678 541.

Less reactive catalysts generally require very long reaction times, and high temperatures as well. Thus U.S. Pat. No. 5,055,502 claims zinc complexes such as zinc diacetylacetonate, as catalysts. The end capping reactions take place over 1 hour at 80° C. with the reaction mixture being stirred. EP-B-304 701 B1 teaches the use of acidic amine salts as catalysts.

The end capping reactions take place over 1 to 3 hours at 70 to 100° C. with the reaction mixture being stirred.

US published application 2005/0234208 describes the reaction of linear polydimethylsiloxanes containing hydroxyl end groups with what are called α-silanes, such as N-(cyclohexylaminomethyl)triethoxysilane, for example. The reaction, after the mixing of polydimethylsiloxanes having OH end groups with α-silanes, takes place over 15 to 60 minutes at room temperature with a planetary mixing system, and also with the addition of butyllithium as catalyst.

SUMMARY OF THE INVENTION

The invention provides a process for preparing organosilicon compounds containing organyloxy groups by reaction of organosilicon compound (A) containing at least one silanol group with organosilicon compound(s) (B) containing at least two organyloxy groups, characterized in that component (A), component (B), and, if desired, further components (C) are mixed mechanically with one another, the power input being at least 0.2 kW per kg of mixture of (A), (B), and, where used, (C).

DETAILED DESCRIPTION OF THE PREFERRED EMBODIMENTS

The organosilicon compound (A) containing silanol groups that is used in accordance with the invention is preferably a compound comprising units of the formula $$R_a(OH)_b SiO_{(4-a-b)/2} \qquad (I)$$

where

R denotes identical or different SiC-bonded, optionally substituted hydrocarbon radicals, a is 0, 1, 2 or 3, preferably 1 or 2, and b is 0, 1 or 2, preferably 0 or 1, with the proviso that the sum of a+b is $\leq 4$ and per molecule there is at least one unit of the formula (I) present with b other than 0.

The organosilicon compounds (A) used in accordance with the invention may be either silanes, i.e., compounds of the formula (I) with a+b=4, or siloxanes, i.e., compounds comprising units of the formula (I) with a+b$\leq$3. Preferably the organosilicon compounds used in accordance with the invention are organopolysiloxanes, more particularly those composed of units of the formula (I).

In the context of the present invention the term "organopolysiloxanes" is intended to embrace polymeric, oligomeric, and dimeric siloxanes.

Examples of R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as the o-, m-, p-tolyl radicals, xylyl radicals, and ethylphenyl radicals; and aralkyl radicals such as the benzyl radical and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical, and the heptafluoroisopropyl radical; and haloaryl radicals such as the o-, m-, and p-chlorophenyl radicals; and also γ-functionalized propyl radicals such as the 3-aminopropyl radical, 3-(2-aminoethyl)aminopropyl radical, 3-glycidyloxypropyl radical, 3-mercaptopropyl radical, and 3-methacryloyloxypropyl radical; or alpha-functionalized methyl radicals such as the N-cyclohexylaminomethyl radical.

Preferably radical R comprises hydrocarbon radicals having 1 to 18 carbon atoms, which are optionally substituted by halogen atoms, amino groups, ether groups, ester groups, epoxy groups, mercapto groups, cyano groups or polyglycol radicals, the latter being composed of oxyethylene and/or oxypropylene units. With particular preference R comprises hydrocarbon radicals having 1 to 8 carbon atoms, more particularly the methyl radical.

Organosilicon compound (A) preferably comprises organosilicon compounds containing one or two silanol groups, and more preferably comprises substantially linear organopolysiloxanes. With particular preference, organosilicon compound (A) comprises linear diorganopolysiloxanes having one silanol group on each chain end.

The organosilicon compounds (A) used in accordance with the invention preferably have a viscosity of 5 to $10^8$ mPas, more preferably of 1000 to 350,000 mPas, in each case at 25° C.

Examples of organosilicon compound (A) used in accordance with the invention are
$HO(Si(CH_3)_2O)_{29-2000}Si(CH_3)_2(CH_2)_3NH_2$,
$HO(Si(CH_3)_2O)_{29-2000}Si(CH_3)_2(OH)$,
$HO(Si(CH_3)_2O)_{5-2000}Si(CH_3)_3$,
$HO(Si(CH_3)_2O)_{0-100}Si(CH_3)_2(CH_2)_3O(CH_2CH(CH_3)O)_{10-1000}(CH_2)_3(Si(CH_2)_2O)_{0-100}Si(CH_3)_2(OH)$,
$HO(Si(CH_3)_2O)_{3-500}Si[O(Si(CH_3)_2O)_{3-500}H]_3$, and
$HO(Si(CH_3)_2O)_{3-500}Si(CH_3)[O(Si(CH_3)_2O)_{3-500}H]_2$,
with
$HO(Si(CH_3)_2O)_{30-2000}Si(CH_3)_2(OH)$ and
$HO(Si(CH_3)_2O)_{5-2000}Si(CH_3)_3$
being preferred and $HO(Si(CH_3)_2O)_{30-2000}Si(CH_3)_2(OH)$ being particularly preferred.

Organosilicon compounds (A) are commercial products and/or are preparable by methods which are common in chemistry.

As a result of its preparation, component (A) may contain small amounts of water, preferably up to 500 ppm by weight, more preferably up to 100 ppm by weight.

The compound (B) containing organyloxy groups that is used in accordance with the invention is preferably a compound comprising units of the formula

  (II)

and/or partial hydrolyzates thereof, where $R^1$ may be identical or different and has a definition specified for radical R, $R^2$ may be identical or different and denotes optionally substituted hydrocarbon radical which may be interrupted by oxygen atoms, c is 0, 1, 2 or 3, d is 0, 1, 2, 3 or 4, and e is 0 or 1, preferably 0, with the proviso that the sum of c+d+e is ≦4 and per molecule there are at least two radicals —$OR^2$ present.

The compounds (B) used in accordance with the invention may be either silanes, i.e., compounds of the formula (II) with c+d+e=4, or siloxanes, i.e., compounds comprising units of formula (II) with c+d+e≦3. Preferably the compounds (B) used in accordance with the invention are silanes of the formula (II), in which case d is preferably 3 or 4, and/or their partial hydrolyzates. The partial hydrolyzates may be either partial homohydrolyzates or partial cohydrolyzates.

Examples of radicals $R^1$ are the examples given for radical R. Preferably radical $R^1$ comprises methyl, ethyl, n-propyl, isopropyl, 1-n-butyl, 2-n-butyl, isobutyl, tert-butyl, phenyl, cyclohexylaminomethyl, and vinyl radicals, with cyclohexylaminomethyl, methyl, and vinyl radicals being particularly preferred.

Examples of radicals $R^2$ are the examples given for radical R. Preferably radical $R^2$ comprises methyl, ethyl, and isopropyl radicals, with the ethyl radical being particularly preferred.

Compound (B) preferably comprises organosilicon compounds containing at least three organyloxy groups, more preferably organosilicon compounds containing three organyloxy groups.

Examples of compound (B) used in accordance with the invention are methyltrimethoxysilane, dimethyldimethoxysilane, tetramethoxysilane, vinyltrimethoxysilane, vinyltriethoxysilane, methylvinyldimethoxysilane, methyltriethoxysilane, tetraethoxysilane, phenyltrimethoxysilane, n-butyltrimethoxysilane, isobutyltrimethoxysilane, tert-butyltrimethoxysilane, (N-cyclohexylaminomethyl)triethoxysilane, and (N-cyclohexylaminomethyl) methyldiethoxysilane, and their partial hydrolyzates, with preference being given to (N-cyclohexylaminomethyl)triethoxysilane, (N-cyclohexylaminomethyl)methyldiethoxysilane, tetramethoxysilane, vinyltrimethoxysilane and vinyltriethoxysilane, and their partial hydrolyzates. With particular preference component (B) comprises vinyltriethoxysilane and (N-cyclohexylaminomethyl)triethoxysilane.

Compounds (B) are commercial products and/or can be prepared by methods which are common in chemistry.

As a result of its preparation, component (B) may contain small amounts of alcohol, preferably up to 5.0% by weight, more preferably up to 1.0% by weight.

In the process of the invention component (B) is preferably used in amounts of 0.1 to 200 parts by weight, more preferably in amounts of 1 to 100 parts by weight, and most preferably in amounts of 1 to 20 parts by weight, based in each case on 100 parts by weight of organosilicon compound (A).

Component (B) is used preferably in a stoichiometric excess, based on the number of silanol groups in (A). With particular preference the stoichiometric excess of (B), based on the number of silanol groups in (A), is greater than 1, and most preferably greater than 3.

Examples of the optional further components (C), which can be used in the process of the invention, are products which are able to influence the reaction rate, such as catalysts, for example. Preferably component (C) comprises catalysts.

Examples of catalysts (C), where used, are carboxylic acids, mineral acids, metal hydroxides, Lewis acids, amines, metal chelates, and metal alkoxylates, such as those of titanium, for example, and combinations thereof.

Preferably the catalysts (C), where used, are carboxylic acids, mineral acids, metal hydroxides, Lewis acids, amines, metal chelates, and metal alkoxylates, such as those of titanium, for example, and combinations thereof.

If catalysts (C) are used in the process of the invention, the amounts in question are preferably 0.0001 to 5 parts by weight, based in each case on 100 parts by weight of organosilicon compound (A).

In the process of the invention it is preferred to use no component (C).

In the process of the invention the individual components can be mixed with one another in any order and in any manner known to date. It is also possible to prepare premixes from a number of components, such as a mixture of components (B) and component (C), for example, which are then mixed with the other components.

It is also possible, moreover, to mix in component (B) or component (C) in portions, in temporal succession.

The components used in the process of the invention may in each case comprise one kind of such a component or else a mixture of at least two kinds of a respective component.

In the process of the invention, in a mixing chamber of any desired design, the components are mixed mechanically with one another in such a way that the energy input in the mixing operation is at least 0.2 kW, preferably at least 0.5 kW, more preferably 1.0 to 100 kW, based in each case on one kilogram of the mixture of (A), (B), and, where used, (C).

If desired—although not preferred—it is also possible for the reaction to be interrupted at any desired point in time. Preferably the reaction is carried out through to the complete consumption of the silanol groups by reaction.

The process of the invention is carried out preferably without additional heating or cooling, at ambient temperatures or at the temperatures which come about when the individual components are mixed. The temperatures in question are preferably from 10 to 150° C., more preferably 15 to 100° C.

The power input leads in general to an increase in temperature of the mixture. This increase in temperature amounts preferably to more than 1° C., more preferably to more than 2° C., and very preferably to 5 to 100° C.

The process of the invention can be carried out continuously or discontinuously; preferably it is carried out continuously.

The process of the invention is carried out preferably at the pressure of the surrounding atmosphere, i.e., 900 to 1100 hPa, or at pressures which come about through the use of mixing systems. Hence operation takes place with particular preference, in the case of a continuous procedure, under superatmospheric pressure, such as between 1100 and 40 000 hPa absolute pressure, for example. These pressures come about generally in closed systems as a result of the pressure in the course of conveying and as a result of the vapor pressure of the materials employed, at elevated temperatures.

The process of the invention is preferably carried out in the absence of moisture, such as in dried air or in deadspace-free mixing assemblies.

In the process of the invention, the power input into the mixture may take place by any known technical methods in which mixing effects occur, such as, for example, atomizing, spraying, conveying, shaking, impacting or shearing.

In the process of the invention, the power input is accomplished preferably by strong shearing of the mixture, where shearing refers to a displacement of liquid layers of the mixture relative to one another.

In the process of the invention the mixing chamber of the mixing assembly is filled preferably completely with mixture, and such that there are no deadspaces present, very preferably when the bower input takes place by shearing.

A strong shearing action is preferably produced by using rotating mixing members with high revolution speeds and/or by arranging rotating mixing members in such a way that they have very narrow shearing gaps relative to one another or to the walls or to other mixing elements.

The input of energy of the invention may be realized in any desired manner known per se.

In one inventive embodiment, which, however, is not preferred, the stirring of the mixture is carried out in a mixer with fast-rotating mixing members, such as dissolver mixers, for example. The dissolvers preferably have revolution speeds of preferably more than 10 m/s, more preferably more than 20 m/s, and most preferably more than 30 m/s. These mixing elements may themselves have any desired forms, preference being given, for example, to disk-shaped elements with jags bent downward and/or upward, or to what are called butterfly mixing elements. These mixers may be the same ones typically utilized for the discontinuous dispersing of solids in liquids. This embodiment of the invention is suitable more particularly for small product quantities.

One preferred embodiment of the process of the invention employs mixers in which the outer housing walls rotate and at the same time there is a rotary movement of the mixing vessel in accordance with the planetary system. Shearing of the mixture comes about as a result of the fast-moving outer boundary of the mixing chamber and of the mixture in the interior.

In one particularly preferred embodiment of the process of the invention, the kinetic energy of the mixture in the form of flow energy with high turbulences is utilized through the use of a rotor/stator mixing system. Here, strong shearing of the mixture takes place between axial product inlet and radial product outlet in the shearing zone between rotor and stator. The diameter of the rotor is preferably more than 10 cm, more preferably 15 to 200 cm. On the rotor there are preferably conveying elements, such as, for example, evolute-shaped conveying elements. Rotor and stator may have an arbitrary number of teeth and slits. Also possible is the arrangement of two or more rotor/stator pairs in succession. In addition to the conveying flow produced in the rotor/stator system, it is possible, especially in the case of high-viscosity mixtures, for upstream, pulsation-free conveying pumps to boost the conveying flow. Examples of suitable rotor/stator mixing systems include mixing turbines, which, for an electrical power consumption of 30 kW, have a mixing capacity of below 10 kilograms in the mixing chamber.

A further preferred embodiment of the process of the invention uses assemblies of the kind employed for conveying operations. Thus it is possible, in the case of gear pumps, for example, for the return flow ratio to be deliberately set such that the strong mechanical action on the mixture, in accordance with the invention, is obtained. The advantage of such assemblies is seen in particular in that the mixture experiences strong shearing and hence strong mixing effects on account, in particular, of the absence of a deadspace.

A further preferred embodiment of the process of the invention uses dynamic mixers, in other words mixers having a mixing shaft which is arranged axially in the mixing chamber and is flow-traversed axially by the material to be mixed. Mixers of this kind also have the advantage that the extent of the mechanical action on the mixtures can be varied, via the rotary speed of the mixing shaft, independently of the throughput, if the mixing elements have little or no conveying action. The throughput in this case can be regulated by means of additional conveying facilities, such as pumps.

In the process of the invention, after the end of the reaction, the reaction mixture can be devolatilized, the devolatilization being carried out by means of vacuum in the same apparatus or in a downstream apparatus, with or without inert gas feeding, at room temperatures or elevated temperatures. The highly volatile constituents are preferably alcohols, such as methanol or ethanol.

In the process of the invention, the mixing times are preferably 0.1 to 3600 seconds, more preferably 2 to 300 seconds. In the case of a discontinuous procedure, the mixing times are a direct product of the duration of mechanical action on the mixture, or in the case of a continuous procedure are calculated as the average residence time from flow rate and vessel capacity.

In accordance with the process of the invention, a multiplicity of organosilicon compounds containing organyloxy groups can be prepared.

Examples of the organosilicon compounds containing organyloxy groups that are prepared in accordance with the invention are
$(MeO)_2(Me)SiO(SiMe_2O)_{30-2000}SiMe_2(CH_2)_3NH_2$,
$(MeO)_2(Me)SiO(SiMe_2O)_{30-2000}SiMe_2OSi(Me)(OMe)_2$,
$(MeO)_2(Me)SiO(SiMe_2O)_{30-2000}SiMe_2OSi(Me)_2(OMe)$,
$(MeO)_2(Me)SiO(SiMe_2O)_{30-2000}SiMe_2OSi(Me)(OMe)_2$,
$(EtO)_2(Vi)SiO(SiMe_2O)_{30-2000}Si(Me_2OSi(Me)(OMe)_2$,
$(MeO)_2(Me)SiO(SiMe_2O)_{30-1000}SiMe_2OSi(OMe)_3$,
$(EtO)_3SiO(SiMe_2O)_{30-2000}SiMe_2OSi(OEt)_3$,
$(MeO)_2(Me)SiO(SiMe_2O)_{5-2000}SiMe_3$,
$(MeO)_2(Me)SiO(SiMe_2O)_{1-100}SiMe_2(CH_2)_3O$
$(CH_2CHMeO)_{10-1000}(CH_2)_3(SiMe_2O)_{1-100}SiMe_2(OSi(Me)(OMe)_2)$,
and $(EtO)_2(cyclohexylaminomethyl)SiO(SiMe_2O)_{30-2000}SiMe_2OSi(cyclohexyl-aminomethyl)(OEt)_2$, where Me is the methyl radical, Et is the ethyl radical, and Vi is the vinyl radical.

The organosilicon compounds prepared in accordance with the invention are preferably compounds having 10 to 10.000, more preferably having 100 to 2000, silicon atoms.

The organosilicon compounds containing organyloxy groups that are prepared in accordance with the invention can be used for all purposes for which organosilicon compounds containing organyloxy groups have also been used to date. In particular, they are suitable for preparing compositions which can be crosslinked by condensation reaction.

The constituents (D) which are typically used for preparing compositions which can be crosslinked by condensation reaction, in addition to the organosilicon compounds containing organyloxy groups that are prepared in accordance with the invention, are constituents selected from the group consisting of crosslinkers, which may be the same compounds as described for component (B), condensation catalysts, adhesion promoters, fillers, plasticizers, stabilizers, dyes, fungicides, and rheological additives. The constituents (D) have already been widely described in the literature. In this regard, reference may be made, for example, to EP-B1-1 397 428 and EP-B1-1 640 416, which are incorporated by reference herein.

These constituents (D) may be added immediately after the reaction of the constituents (A), (B), and optionally (C) such that the crosslinkable compositions with the organosilicon compounds containing organyloxy groups that are prepared in accordance with the invention as a base polymer, may be prepared in one reaction vessel. Alternatively the constituents (D) can be added after storage of the organosilicon compounds containing organyloxy groups that are prepared in accordance with the invention, storage being for a few minutes up to several months.

With the process of the invention it is possible, though not preferred, for one or more constituents (D), such as fillers or plasticizers, for example, to be mixed with component (A) even prior to the reaction of the invention.

The process of the invention has the advantage that it is possible in a simple way, with short reaction times, to prepare organosilicon compounds containing organyloxy groups, and that it is possible to prepare organosilicon compounds containing organyloxy groups without external heating of the reaction vessel.

The process of the invention has the further advantage that the organosilicon compounds containing organyloxy groups that are prepared do not, even after any storage, exhibit hazing and can therefore be employed optimally for the production of transparent curable compositions.

The process of the invention also has the advantage that the organosilicon compounds containing organyloxy groups that are prepared in accordance with the invention can be used for preparing crosslinkable compositions straight after their preparation, without prior isolation or aftertreatment, such as neutralization, filtration or deactivation of catalyst by means of high temperatures. The process of the invention has the advantage, furthermore, that it can be carried out continuously.

In the examples below, all indications of parts, unless indicated otherwise, are by weight. Unless indicated otherwise, the following examples are carried out at the pressure of the surrounding atmosphere, i.e., at about 1000 hPa, and at room temperature, i.e., about 20° C., or at a temperature which is established when the reactants are combined at room temperature without additional heating or cooling. All of the viscosity figures quoted in the examples relate to a temperature of 25° C.

In the text below, the assessment of the alkoxy-terminated polydimethylsiloxanes prepared, for the purpose of ascertaining the very substantial absence of silanol groups (Si OH content less than 30 ppm by weight), is carried out by means of what is referred to as the rapid titanate test: 10 g of prepared polymer (e.g., polymer which prior to the reaction, with a viscosity of 78,000 mPa·s, contained 420 ppm by weight of Si-bonded OH groups) and isopropyltitanate (approximately 0.1 g) were stirred together with a spatula for 3 minutes. When a sample which has been drawn upward runs downward in a thin thread, the sample is very largely silanol-free. When the upwardly drawn sample breaks, then it still contains more than 30 ppm by weight of Si-bonded OH groups.

The advantage of this test is primarily that it can be carried out very rapidly immediately after the end capping reaction.

Inventive Example 1

The mixing assembly used was a mixer (I) which has a rotating mixing vessel which is arranged on a likewise rotating plate, with no further mixing elements in the mixing vessel. It is driven via a three-phase motor. Mixers of this kind are described, for example, in EP-B-1 293 245, which is incorporated by reference herein.

In the mixer (I), 50 g of an α,ω-dihydroxypolydimethylsiloxane having a viscosity of 78,000 mPa·s (measured at 25° C. with a rotational viscometer) and 1.5 g of cyclohexylaminomethyltriethoxysilane are mixed with one another in a cylindrical PE beaker, with a rotary speed of the mixing vessel of 3,500 revolutions per minute, for a duration of 60 seconds. The cylindrical mixing vessel, with a smooth interior, was composed of polyethylene, had a volume of approximately 150 ml, and was sealed with a screw-top lid. The rotating plate had a diameter of approximately 18 cm.

The Si-bonded OH content of the polymer prior to the reaction was 420 ppm. No catalysts were used. The starting temperature of the components was 25° C.

The power input into the material to be mixed was detected using a commercial measuring instrument, as the difference between the electrical outputs of the mixer measured rotating "on empty", in other words without any mixing material in the mixing beaker, and rotating "on full", in other words with 51.5 g of mixing material present in the PE beaker.

The power determined for the empty mixer was 178.9 watts.

The power determined for the full mixer was 274.4 watts. From this, the calculated energy input is 95.5 watts. In other words, the mixing material was acted on mechanically with a specific power, in accordance with the invention, of 1.85 kilowatts per kg of reactant mixture.

The titanate test carried out immediately after mixing was negative: that is, the end capping reaction had ended even within this short reaction time.

Inventive Example 2

The procedure described in inventive example 1 was repeated, with the modification that the two components were mixed with one another at a rotary speed of the mixing vessel of 2500 revolutions per minute.

The power determined for the empty mixer was 151.1 watts.

The power determined for the full mixer was 185.8 watts. From this, the calculated power input is 34.7 watts. In other words, the mixing material was acted on mechanically with a specific power, in accordance with the invention, of 0.67 kilowatts per kg of reactant mixture.

The titanate test carried out immediately after mixing was negative: that is, the end capping reaction had ended even within this short reaction time.

Comparative Example 1

The procedure described in inventive example 1 was repeated, with the modification that the two components were mixed with one another at a rotary speed of the mixing vessel of 1500 revolutions per minute.

The power determined for the empty mixer was 128.1 watts.

The power determined for the full mixer was 131.2 watts. From this, the calculated power input is 3.1 watts. In other words, the mixing material was acted on mechanically with a specific power, which was low, of 0.06 kilowatts per kg of reactant mixture.

The titanate test carried out immediately after mixing was positive: that is, the end capping reaction was still not at an end within this short reaction time.

Comparative Example 2

The $\alpha,\omega$-dihydroxypolydimethylsiloxane and the cyclohexylaminomethyltriethoxysilane used in inventive example 1 were thermally conditioned separately from one another at 60° C. for 4 hours. Following the addition of 1.5 g of cyclohexylaminomethyltriethoxysilane to 50 g of $\alpha,\omega$-dihydroxypolydimethylsiloxane, mixing took place for 60 seconds at 1500 revolutions per minute.

The end capping reaction was not at an end, since the titanate test carried out immediately thereafter was positive.

Inventive Example 3

The reaction of the $\alpha,\omega$-dihydroxypolydimethylsiloxane and cyclohexylaminomethyltriethoxysilane described in inventive example 1 was carried out in a laboratory dissolver (mixer II) at the pressure of the surrounding atmosphere.

For this purpose, 400 g of the $\alpha,\omega$-dihydroxypolydimethylsiloxane were mixed intensely with 12 g of cyclohexylaminomethyltriethoxysilane at a starting temperature of 25° C. for 3 minutes. The mixing shaft with dissolver gear, whose diameter was approximately 6.5 cm, was set at 5000 revolutions per minute. The mixing vessel of plate steel, which had a diameter of approximately 12 cm and a height of approximately 12 cm, was not cooled and not heated.

The drive output of the three-phase motor, for a mixing shaft rotational speed of 1000 revolutions per minute, according to the indications of the manufacturer, was 0.75 kilowatt. Since there was a simple transmission of force from the electrical motor to the mixing shaft via a gear transmission, an efficiency of 0.9 can be set. This efficiency is the ratio of mechanical input of mixing energy by the dissolver disk into the mixer to electrical power consumption of the motor. From 0.75 kilowatt of power consumption and an efficiency of 0.9, the calculated input of power is 0.68 kilowatt. This results in a specific output, in accordance with the invention, of 1.65 kilowatts per kg of reactant mixture.

The titanate test carried out immediately after the mixing operation was negative; in other words, the end capping reaction was concluded within the 3 minutes of mixing time.

Inventive Example 4

The reaction of the $\alpha,\omega$-dihydroxypolydimethylsiloxane with a viscosity of 78,000 mPa·s and cyclohexylaminomethyltriethoxysilane, described in inventive example 1, was carried out continuously in a mixer with a rotor/stator mixing system, as is described in EP-B-101 46 395, which is incorporated herein by reference.

The two starting materials, with a temperature of 23° C., were metered into the mixing chamber in free fall from above via an addition opening, in a weight ratio of 100:3, separately from one another and continuously, under the surrounding pressure of the atmosphere and at room temperature. The mixing chamber consisted of a housing, within which a horizontally disposed, disk-shaped rotor with a diameter of 26 cm rotated, said rotor having evolute-shaped mixing elements with a height of 3.0 cm. Located at a distance of 1 cm from the outer periphery of the rotor was the inside of the stationary stator, which along its periphery had 46 teeth each with a width of approximately 0.7 cm. The rotor was operated at 800 revolutions per minute. In the course of this operation, the mixing material was forced outward by the centrifugal force, and then impacted on the stator, and was subject to strong shearing between rotor and stator. About 1 cm after the stator, the mixed material is pressed into the radial outlet opening. A blocking device a short way downstream of the outlet was closed to an extent such that, following precise regulation of the metering quantities, a throughput of 1000 kg/h came about under a pressure of approximately 1800 hPa at the outlet.

The cylindrical mixing chamber, which was approximately 5 cm high, not including the top-mounted addition opening for the starting materials, was continually filled completely with approximately 3.0 kg of material to be mixed. There were no deadspaces.

The average residence probability of the material for mixing, based on the mixing chamber, is 0.003 hour.

As a result of mixing, the temperature of the mixture material went up to 33'C. In order to heat 1000 kg of mixture material by 10 degrees, approximately 15,500 kJ are required (specific heat capacity of polydimethylsiloxanes: 1.55 J/g K). This corresponds to a power input of 4.3 kilowatt hours, which was converted over an hour from mechanical energy into thermal energy. Hence the power input is 4.3 kilowatts over an hour, and the specific power input is at least 1.43 kilowatts per kilogram of reactant mixture in the mixing chamber, considering the amount of product to be mixed in the mixing chamber as a whole. If the power input were to be made relative, for example, to the volume of the stator and to the volume swept by the mixing elements of the rotor, the calculated power input would be substantially higher still, namely 4.3 kilowatts for approximately 0.2 liter, in other words more than 20 kilowatts per kilogram of reactant mixture.

The titanate test, carried out immediately after mixing, on samples taken immediately downstream of the blocking device, was negative—in other words, the end capping reaction had concluded.

The invention claimed is:

1. A process for preparing organosilicon compounds containing organyloxy groups by reaction of a mixture comprising at least one organosilicon compound (A) containing at least one silanol group with at least one organosilicon compound (B) containing at least two organyloxy groups, the process comprising mechanically mixing component (A), component (B), the power input of mixing being at least 0.2 kW per kg of the mixture such that components (A) and (B) react during mixing to form an organyloxy-functional organosilicon compound, wherein mixing is accomplished by shearing in a mixing chamber, wherein the mixing chamber is filled completely with the mixture.

2. The process of claim 1, wherein at least one organosilicon compound (A) containing at least one silanol group is a compound comprising units of the formula $$R_a(OH)_b SiO_{(4-a-b)/2} \quad (I)$$

where

R each individually is an SiC-bonded, optionally substituted hydrocarbon radical, a is 0, 1, 2 or 3, and b is 0, 1 or 2, with the proviso that the sum of a+b is $\leq 4$ and per molecule there is present at least one unit of the formula (I) wherein b is other than 0.

3. The process of claim 1, wherein at least one compound (B) comprises units of the formula $$R^1_c(OR^2)_d(OH)_e SiO_{(4-c-d-e)/2} \quad (II)$$

and/or a partial hydrolyzate thereof, where $R^1$ each individually is an identical or different SiC-bonded optionally substituted hydrocarbon radical, $R^2$ each individually is an identical or different optionally substituted hydrocarbon radical optionally containing at least one ether linkage, c is 0, 1, 2 or 3, d is 0, 1, 2, 3 or 4, and e is 0 or 1, with the proviso that the sum of c+d+e is $\leq 4$ and per molecule there are at least two radicals —$OR^2$ present.

4. The process of claim 2, wherein at least one compound (B) comprises units of the formula $$R^1_c(OR^2)_d(OH)_e SiO_{(4-c-d-e)/2} \quad (II)$$

and/or a partial hydrolyzate thereof, where $R^1$ each individually is an identical or different SiC-bonded optionally substituted hydrocarbon radical, $R^2$ each individually is an identical or different optionally substituted hydrocarbon radical optionally containing at least one ether linkage, c is 0, 1, 2 or 3, d is 0, 1, 2, 3 or 4, and e is 0 or 1, with the proviso that the sum of c+d+e is $\leq 4$ and per molecule there are at least two radicals —$OR^2$ present.

5. The process of claim 1, wherein component (B) is used in an amount of 0.1 to 200 parts by weight based on 100 parts by weight of organosilicon compound (A).

6. The process of claim 2, wherein component (B) is used in an amount of 0.1 to 200 parts by weight based on 100 parts by weight of organosilicon compound (A).

7. The process of claim 3, wherein component (B) is used in an amount of 0.1 to 200 parts by weight based on 100 parts by weight of organosilicon compound (A).

8. The process of claim 1, wherein at least one component (C) which comprises a catalyst is also present in the mixture.

9. The process of claim 1, wherein the energy input in the mixing operation is at least 0.5 kW, based on one kilogram of the mixture.

10. The process of claim 1, wherein the energy input in the mixing operation is 1.0 to 100 kW, based on one kilogram of the mixture.

11. The process of claim 1, wherein mixing is carried out continuously.

12. The process of claim 1, wherein no heat other than that provided by mixing is supplied.

* * * * *